US010057179B2

(12) United States Patent
Salle et al.

(10) Patent No.: US 10,057,179 B2
(45) Date of Patent: Aug. 21, 2018

(54) POLICY BASED SCALING OF NETWORK RESOURCES

(75) Inventors: Mathias Salle, San Francisco, CA (US); Reinier J. Aerdts, Plano, TX (US); Chandra H. Kamalakantha, Plano, TX (US)

(73) Assignee: Hewlett Packard Enterprise Development Company LP, Houston, TX (US)

( * ) Notice: Subject to any disclaimer, the term of this patent is extended or adjusted under 35 U.S.C. 154(b) by 191 days.

(21) Appl. No.: 14/395,684

(22) PCT Filed: Jul. 20, 2012

(86) PCT No.: PCT/US2012/047723
§ 371 (c)(1),
(2), (4) Date: Oct. 20, 2014

(87) PCT Pub. No.: WO2014/014479
PCT Pub. Date: Jan. 23, 2014

(65) Prior Publication Data
US 2015/0089064 A1     Mar. 26, 2015

(51) Int. Cl.
*G06F 15/173* (2006.01)
*H04L 12/911* (2013.01)
(Continued)

(52) U.S. Cl.
CPC ............ *H04L 47/70* (2013.01); *G06F 9/5022* (2013.01); *G06F 9/5072* (2013.01); *H04L 47/125* (2013.01)

(58) Field of Classification Search
CPC ........ G06F 9/46; G06F 9/5061; G06F 9/5072; G06F 9/5066; G06F 17/30557;
(Continued)

(56) References Cited

U.S. PATENT DOCUMENTS 8,261,295 B1 * 9/2012 Risbood ................ G06F 8/61
717/177
8,954,557 B2 * 2/2015 Gusev ..................... 709/220
(Continued)

FOREIGN PATENT DOCUMENTS

CN      1373871     10/2002
CN      1645815      7/2005
(Continued)

OTHER PUBLICATIONS

"Cloud Application Management"; http://www.appdynamics.com/solutions-cloud-computing.php.
(Continued)

*Primary Examiner* — Dustin Nguyen
(74) *Attorney, Agent, or Firm* — Fabian VanCott

(57) ABSTRACT

A method of policy-based scaling of network resources comprises, with a processor, creating a dependency data set for a number of application components m a network, setting a number of scaling policies by tier based on the dependency date set, and applying the scaling policies within the network. A cloud management device for policy-based scaling of network resources comprises a processor, and a data storage device communicatively coupled to the processor, in which the processor creates a dependency data set for a number of application components on a network, and sets a number of scaling policies by tier based on the dependency data set.

17 Claims, 4 Drawing Sheets

(51) Int. Cl.
 *G06F 9/50* (2006.01)
 *H04L 12/803* (2013.01)
(58) Field of Classification Search
 CPC .... G06F 9/5077; G06F 11/008; G06F 9/5083;
  H04L 41/0893; H04L 47/70; H04L 67/16;
  H04L 67/1076
 USPC ........ 709/220, 223, 224, 226; 718/102, 103;
  717/177; 707/802
 See application file for complete search history.

(56) References Cited

U.S. PATENT DOCUMENTS

| | | | |
|---|---|---|---|
| 8,966,039 B1* | 2/2015 | Fultz | H04L 67/16 709/223 |
| 2003/0120780 A1 | 6/2003 | Xiaoyun et al. | |
| 2005/0160428 A1 | 7/2005 | Ayachitula et al. | |
| 2006/0195560 A1* | 8/2006 | Newport | H04L 41/0893 709/223 |
| 2009/0100435 A1 | 4/2009 | Papaefstathiou et al. | |
| 2010/0042720 A1 | 2/2010 | Stienhans et al. | |
| 2010/0061250 A1 | 3/2010 | Nugent | |
| 2011/0061089 A1 | 3/2011 | O'Sullivan et al. | |
| 2011/0078303 A1 | 3/2011 | Li et al. | |
| 2011/0119312 A1* | 5/2011 | Chopra | G06F 17/30557 707/802 |
| 2011/0161391 A1 | 6/2011 | Araujo et al. | |
| 2011/0225017 A1 | 9/2011 | Radhakrishnan | |
| 2011/0307886 A1* | 12/2011 | Thanga | G06F 9/5077 718/1 |
| 2012/0057191 A1 | 3/2012 | Gnanasambandam et al. | |
| 2012/0060165 A1 | 3/2012 | Clarke | |
| 2012/0096149 A1* | 4/2012 | Sunkara | G06F 9/5072 709/224 |
| 2012/0102369 A1* | 4/2012 | Hiltunen | G06F 11/008 714/48 |
| 2012/0324070 A1* | 12/2012 | Campion | G06F 9/5066 709/223 |
| 2013/0007753 A1* | 1/2013 | Jain | G06F 9/46 718/103 |
| 2013/0054776 A1* | 2/2013 | Kunze | G06F 9/5061 709/224 |
| 2013/0174149 A1* | 7/2013 | Dasgupta | G06F 9/5077 718/1 |
| 2013/0174168 A1* | 7/2013 | Abuelsaad | G06F 9/5072 718/102 |
| 2015/0074278 A1* | 3/2015 | Maes | H04L 47/70 709/226 |

FOREIGN PATENT DOCUMENTS

| | | |
|---|---|---|
| EP | 1587282 | 10/2005 |
| KR | 1020110027570 | 7/2014 |

OTHER PUBLICATIONS

"Introduction to Cloud for HPC"; http://www.adaptivecomputing.com/docs/455.
Lippis, N.; "Lippis Report 187: Sofware-defined Networking Needs a Bigger Definition"; http://lippisreport.com/2012/02/lippis-report-187-software-defined-networking-needs-a-bigg.
Ohlhorst, F.J.; "Bright Computing Targets Cloud Bursting" May 9, 2012; http://www.networkcomputing.com/cloud-computing/232901639?pgno=1.
Wood, et al CloudNet: Dynamic Pooling of Cloud Resources by live WAN Migrantion of Virtual Machines. Mar. 9-11, 2011.
International Search Authority.International Search Report, dated Mar. 13, 2013. Application No. PCT/US2013/047723 Filing date Jul. 20, 2012.
EPO; European Search Report; 12881503.2-1957 2875440/ PCT/US2012/47723; dated Apr. 21, 2016 ; 6 pages.
PCT; "Notification of Transmittal of the International Search Report and The Written Opinion of the International Searching Authority, or the Declaration"; cited in PCT/US2012/047723; dated Mar. 13, 2013; 9 pages.
EPO; "EPO 4mo. Office Action"cited in EP Appl. No. 12881503.2; dated Jun. 7, 2018; 8 pages.
Zhang, H., et al.; "Intelligent Workload Factoring for a Hybrid Cloud Computing Model"; Jul. 6, 2009; 9 pages.

\* cited by examiner

POLICY BASED SCALING OF NETWORK RESOURCES

BACKGROUND

Cloud computing services have become increasingly available to individuals and business entities in order to allow those individuals or business entitles to expand their information technology (IT) infrastructures and resources. These individuals and business entities often enter into contracts with the cloud services provider at times in which the individual's or business entity's internal IT infrastructures or resources are over-utilized or otherwise insufficient to accommodate an increase in network activity. This increase in network activity may be due to, for example, an increase in sells of their respective goods or services. Thus, an individual or business entity may take advantage of the economies of scale associated with the public cloud computing services.

After purchasing public cloud computing services, the individuals or business entities may desire to scale in or scale out the level of cloud services the individuals or business entitles purchase. However, it may be difficult for these individuals and business entitles to know at what point or level it may be advantageous to purchase external cloud services or adjust the amount of resources within the cloud network they purchase.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
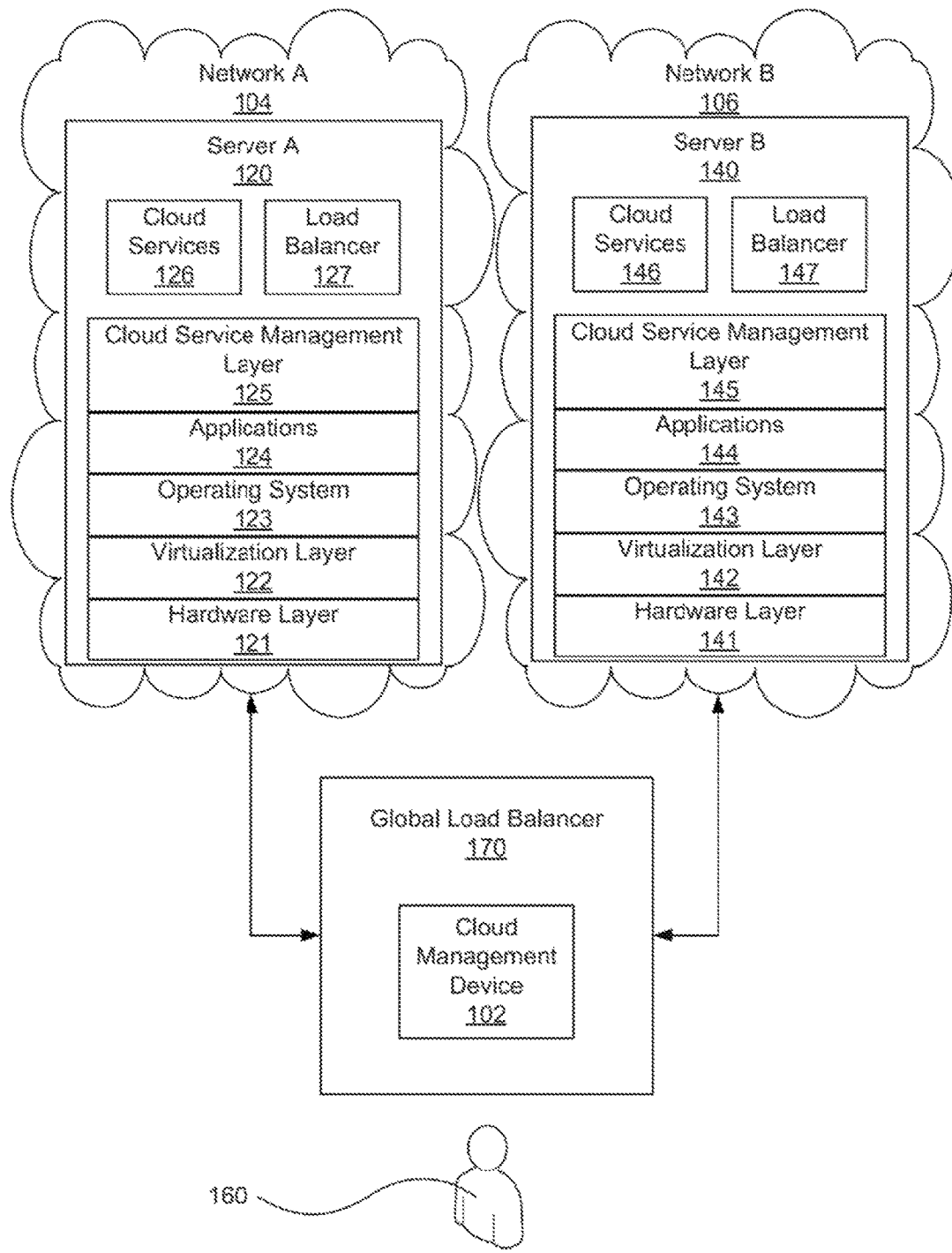
FIG. 1 is a block diagram of a system for scaling out to an external network, according to one example of the principles described herein.

The present systems and methods provide a method of policy-based scaling of network resources comprising, with a processor, creating a dependency data set for a number of application components on a network, setting a number of scaling policies by tier based m the dependency data set, and applying the scaling policies within the network. The present systems and methods also provide a cloud management device for scaling out to resources to another cloud network or scaling resources within a cloud network. The system comprises a processor, and a data storage device communicatively coupled to the processor, in which the processor creates a dependency data set for a number of application components on a network, and sets a number of scaling policies by tier based on the dependency data set. The present systems and methods also provide a cloud management device for scaling in a number of resources from, for example, a public cloud network into a private cloud network, or scaling in resources within a cloud network such as, for example, a public could network.

As demonstrated above, it may be difficult for an individual or business entity to determine when it may be advantageous to purchase external cloud services or purchase more or less of those services. For example, an individual or business entity may not realize at what point such a purchase of external cloud services may most economical for their underlying business activities. Certain environmental factors such as the market in which the external cloud services are to be use, the internal or private network on which the individual or business entity is currently utilizing and seeking to scale out from, the economical advantages of scaling out to an external cloud service versus remaining within the internal private network, among others.

As used in the present specification and in the appended claims, the term "cloud" is meant to be understood broadly as any network that delivers requested virtual resources as a service. In one example, a cloud network may provide a computing environment where users can have access to applications or computing resources, as services, from anywhere through their connected devices. These services may fee provided by entitles called cloud services providers. Examples of services that may be provided via a cloud network include infrastructure as a service (IaaS), platform as a service (PaaS), and software as a service (SaaS).

Further, as used in the present specification and in the appended claims, the term "public cloud" is meant to be understood broadly as a number of services provided by a service provider over a network that makes applications, storage, and other resources available to the general public. In one example, these services are offered by the service provider on a pay-per-use model. In this example, the public cloud service providers own and operate the infrastructure. In another example, the public cloud service provider offers access via a public network such as, for example, the Internet, and direct connectivity is not offered. An example of a cloud service provided within a public cloud may be AMAZON WEB SERVICES developed and sold as a service by Amazon.com, Inc., or the RACKSPACE CLOUD web application hosting services developed and provided by Rackspace US, Inc.

As used m the present specification and in the appended claims, the term "private cloud" is meant to be understood broadly as any cloud computing environment in which access is exclusively limited to an individual or a business entity. In one example, a private cloud may be any cloud infrastructure operated solely for a single individual or business entity. In one example, the private cloud is managed infernally by the owner of the private cloud infrastructure. In another example, the private cloud is managed by a third-party and hosted internally or externally.

As used in the present specification and in the appended claims, the term "hybrid cloud" is meant to be understood broadly as any cloud computing environment that comprises a number of public cloud resources and a number of private cloud resources. In one example, a hybrid cloud comprises a number of cloud networks such as private clouds and public clouds that remain individual networks but are associated to offer a number of services.

As used in the present specification and in the appended claims, the term "scaling out" or similar language is meant to be understood broadly as any activity that allocates or consumes more resources within a cloud computing environment in order to accommodate an increase in network activity. Similarly, as used in the present specification and in the appended claims, the term "scaling in" or similar language is meant to be understood broadly as any activity that releases, frees up, or discharges the resources within a cloud computing environment.

As used in the present specification and in the appended claims, the term "dependency data set" is meant to be understood broadly as any data set that defines a number of relationships between applications and instances of network resources as deployed within a network. Thus, the dependency data set may be used to define how the applications may be deployed or scaled out in one example, the dependency data set defines a number of relationships between applications and other instances of cloud network resources within a cloud services network such as, for example, a hardware layer, a visualization layer, an operating system, software dependencies, other applications, application modules within the applications, properties of the applications, information regarding the version of the applications, binaries of the applications, properties of application modules within the applications, a load balancer, servers, the types of servers, web servers within a network, application servers within a network, databases within the hardware layer, cloud services, credentials, monitoring or management tools used in the public cloud, and service offerings consumed within the public cloud, among others.

In one example, the dependency data set may be represented as a hierarchal tree with a root node symbolizing a root resource, and a number of levels of child nodes symbolizing the relationship of a number of resources and their dependency from the root resource and their dependency with each other. Lines between the root node and the child nodes symbolize the relationships and dependencies between the various elements within network A (104).

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to FIG. 1, a block diagram of a system (100) for scaling out to an external network, according to one example of the principles described herein is shown. FIG. 1 depicts a system (100) for scaling out from a first network such as, for example, an internal or private network to a second network such as, for example, an external cloud network. In one example, the external cloud network is a public cloud supported by a public cloud service provider. The system (100) may comprise a number of networks. In the example of FIG. 1, network A (104) and network B (106) are depicted. Although two networks (104, 106) are shown in FIG. 1, any number of networks (104, 106) may be communicatively coupled to a global load balancer (170). Although the global load balancer (170) is depicted in FIG. 1 as a specific network device, any network device may be employed in the present systems and methods. For example, network devices such as server load balancers (127, 147), network switches, or other network, devices may be employed to fill the role of the global load balancer (170). However, throughout the specification, the example employing the global load balancer (170) will be described.

The global load balancer (170) may be communicatively coupled to the networks (104, 106) within the system (100). As will be described in more detail below, the global load balancer (170) may further comprise a cloud management device (102). The global load balancer (170), via the cloud management device (102), setting a number of scaling policies by tier within a number of networks (104, 106). In one example, the global load balancer (170) has access to the processor (FIG. 2, 202) of the cloud management device (102), and may control the functions of the cloud management device (102).

In one example, the networks are cloud services networks as defined above. Throughout the present specification and drawings, network A (104) and network B (106) will be described as cloud services networks. However, any form of network may be employed in bringing about the objectives of the present systems and methods.

As depicted in FIG. 1, the cloud management device (102) is embedded within the global load balancer (170) and operates at the network level, as will be described in more detail below. In one example, the global load balancer (170) and cloud management device (102) may be incorporated into one of the networks (104, 106). In this example, an administrator (160) of the network (104, 106) into which the global load balancer (170) and cloud management device (102) are incorporated may be tasked with using the cloud management device (102) to bring about the functionally provided by the cloud management device (102). Further, in another example, the global load balancer (170) and cloud management device (102) may communicate with a set of networking devices. Also, in this example, the cloud management device (102) may be provided as a computer program product as will be described in more detail below.

In another example, the cloud management device (102) may be embedded within one of the networks (104, 106), to this example, the global load balancer (170) may be located external to the network (104, 106) and interact with the embedded cloud management device (102) to set scaling policies by tier within the network (104, 106).

In still another example, the global load balancer (170) and cloud management device (102) may be separate from the networks (104, 106). In this example, the global load balancer (170) may be controlled by a third party, and its functionality may be provided as a service.

In the above examples, the global load balancer (170) and cloud management device (102) may be deployed in association with a private cloud to allow for scaling out to public clouds external to the private cloud. Also, the global load balancer (170) and cloud management device (102) may be deployed within a public cloud to enable automatic scaling within the public cloud itself.

The networks (104, 106) may comprise a number of servers (120, 140). In the example, of FIG. 1, each network (104, 106) comprises one server (120, 140). However, each network (104, 106) may comprise any number of servers (120, 140). As shown in FIG. 1, each server comprises a hardware layer (121, 141) comprising, for example, a processor and memory, among other computer hardware devices to form a computing device.

The hardware layer (121, 141) supports a virtualization layer (122, 142). The visualization layers (122, 142) within the servers (120, 140) provide an abstraction layer from which the virtual entitles such as, for example, virtual servers; virtual storage; virtual networks, including virtual private networks; virtual applications and operating systems; and virtual clients, among others may be instantiated. Specifically, a number of operating systems (123, 143) and applications (124, 144) may be executed by a processor in the hardware layers (121, 141). Although one operating system (123, 143) and application (124, 144) are shown within the servers (120,140) of FIG. 1, any number of virtual machines composing their own respective operating systems and applications may fee instantiated within the (120, 140) to provide a user or a number of different users access to these virtual resources.

In one example, the applications (124, 144) executed on the servers (120, 140) may be executed on the same or different types of respective operating systems (123,143). Each of the applications (124, 144) and their respective operating systems (123, 143) may be associated with additional virtual resources supported by the hardware layers (121, 141) such as, for example a processor, memory, network, adapters, and data storage device, among others.

The cloud service management layers (126, 146) within the networks (104, 106) provide management of cloud services residing on the servers (120, 140) within the networks (104, 106). In one example, the cloud service management layers (125, 145) provision resources, Resource provisioning provides dynamic procurement of computing resources and other resources that are utilized to perform tasks within the cloud computing environment. In another example, the cloud service management layers (125, 145) provide service level management where cloud computing resources are allocated such that contracted service levels are met. In still another example, the cloud service management layers (125, 145) perform a combination of be above services.

A number of cloud services (126, 146) are supported by the servers (120, 140) within the networks (104, 106). As described above, examples of services that may be provided via a cloud network include infrastructure as a service (IaaS), platform as a service (PaaS), and software as a service (SaaS). Thus, the applications (124, 144), operating systems (123, 143), cloud service managements layer (125, 145), and hardware layer (121, 141) may be used to provide a user with a number of these types of services. In one example, the cloud services (126, 146) support an underlying service in which the user or purchaser of the cloud services (126, 146) is engaged. For example, the user or purchaser of the cloud services (126, 146) may, in one example, be engaged in selling goods or services themselves, and do so through the cloud services (126, 146) provided by the owner end operator of network B (106) for example.

In the present example, for the purposes of simplicity in illustration, the global load balancer (170), cloud management device (102), server A (120), and server B (140) are separate computing devices communicatively coupled to each other through their respective network connections. However, the principles set forth in the present specification extend equally to any alternative configuration. As such, alternative examples within the scope of the principles of the. present specification include, but are not limited to, examples in which the global load balancer (170), cloud management device (102), server A (120) and server B (140) are implemented by the same computing device, examples in which the functionality of the global load balancer (170), cloud management device (102), server A (120) or server B (140) is implemented by multiple interconnected computers, and examples in which the global load balancer (170), cloud management device (102), server A (120) and server B (140) communicate directly through a bus without intermediary network devices.

As described above, the global load balancer (170) and cloud management device (102) may be implemented on either server A (120) or server B (140) in order to manage the scaling in or scaling out of cloud services. In still another example, the global load balancer (170) and cloud management device (102) may be implemented by a third party as a service. In this example, the third party may be a organization or business entity such as, for example, Hewlett Packard with its developed CLOUDSYSTEM cloud network infrastructure that assists in building private, public, and hybrid cloud computing environments by combining storage, servers, networking, and software.

As described above, the system (100) may further comprise a cloud management device (102). The cloud management device (102) provides access to the cloud computing environment created by the networks (104, 106) for consumers and system administrators (160), and assists and defines the scaling in and scaling out of cloud services as will be described in more detail below.

Figure 2:
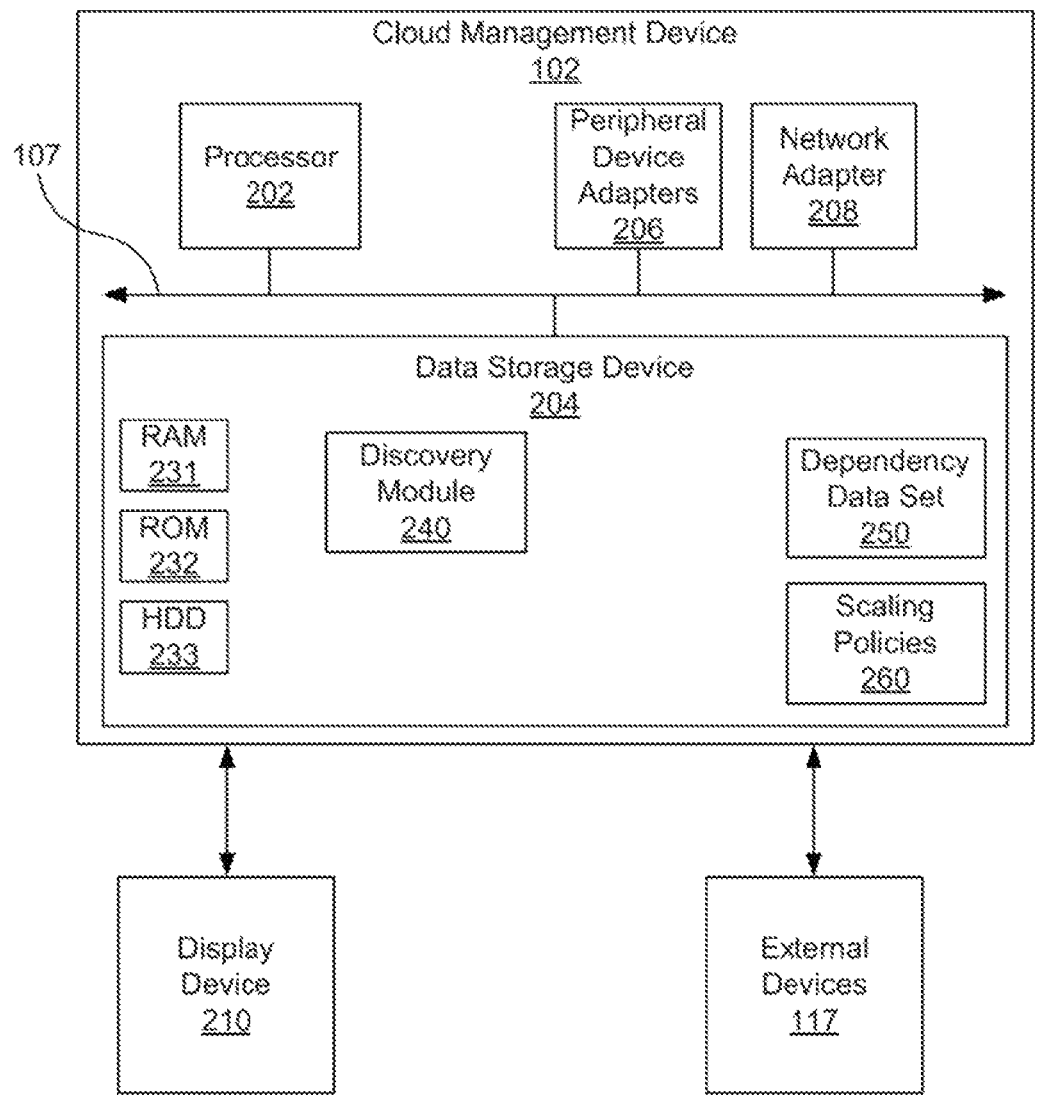
FIG. 2 is a block diagram of the cloud management device of FIG. 1, according to one example of the principles described herein.

FIG. 2 is a block diagram of the cloud management device of FIG. 1, according to one example of the principles described herein. In one example, the cloud management device (102) is a computing device that performs the methods described herein at the network level. In another example, the cloud management device (102) is a mobile computing device such as, for example, a mobile phone, smart phone, personal digital assistant (PDA), or a laptop computer with the capability of performing the methods described herein.

To achieve its desired functionality, the cloud management device (102) comprises various hardware components. Among these hardware components may be at least one processor (202), at least one data storage device (204), peripheral device adapters (206), and a network adapter (208). These hardware components may be interconnected through the use of a number of busses and/or network connections, in one example, the processor (202), data storage device (204), peripheral device adapters (206), and a network adapter (208) may be communicatively coupled via a bus (107).

The processor (202) may include the hardware architecture that retrieves executable code from the data storage device (204) and execute the executable code. The executable code may, when executed by the processor (202), cause the processor (202) to implement at least the functionality of managing the scaling in and scaling out of cloud network services at the network level according to the methods of the present specification described below. In the course of executing code, the processor (202) may receive input from and provide output to a number of the remaining hardware units.

The data storage device (204) may store date such as executable program code that is executed by the processor (202) or other processing device. As will be discussed, the data storage device (204) may specifically store a number of applications that the processor (202) executes to implement at least the functionality of managing the scaling in and scaling out of cloud network services.

The data storage device (204) may include various types of memory modules, including volatile and nonvolatile memory. For example, the data storage device (204) of the present example includes Random Access Memory (RAM) (231), Read Only Memory (ROM) (232), and Hard Disk Drive (HDD) memory (233). Many other types of memory are available in the art, and the present specification contemplates the use of many varying type(s)of memory (130) in the data storage device (204) as may suit a particular application of the principles described herein. In certain examples, different types of memory in the data storage device (204) may be used for different data storage needs. For example, in certain examples the processor (202) may boot from Read Only Memory (ROM) (232), maintain nonvolatile storage in the Hard Disk Drive (HDD) memory (233), and execute program: code stored in Random Access Memory (RAM) (231).

Generally, the data storage device (204) may comprise a computer readable storage medium. For example, the data storage device (204) may be, but not limited to, an electronic, magnetic, optical, electromagnetic, infrared, or semiconductor system, apparatus, or device, or any suitable combination of the foregoing. More specific examples of the computer readable storage medium may include, for example, the following; an electrical connection having a number of wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The hardware adapters (206, 208) in the cloud management device (102) enable the processor (202) to interface with venous other hardware elements, external and internal to the cloud management device (102). For example, peripheral device adapters (206) may provide an interface to input/output devices, such as, for example, display device (210), to create a user interface and/or access external devices (117). As will be discussed below, an output device (150) may be provided to allow a user (FIG. 1, 160) to interact with and implement the functionality of the cloud management device (102).

Peripheral device adapters (206) may also create an interface between the processor (202) and a printer, the display device (210), or other media output device. The network adapter (208) may provide an interface to the networks (104, 106), thereby enabling the transmission of data between the cloud management device (102), and networks (104, 106).

The cloud management device (102) may further comprise a discovery module (240). The discovery module (240) searches for and identifies assets such as programs and other program components hosted on a public cloud network such as, for example, network B (106), to which cloud services may be scaled out. In one example, the discovery module (240) is stored within the data storage device (204) of the cloud management device (102), and is accessible and executable by the processor (202).

The cloud management device (102) further comprises a dependency data sat (250) stored within the data storage device (204). The dependency data set (250) is created as a result of the discovery module (240) discovering programs and other program components within the public network A (104). The processor (202) analyzes the results of the discovery module (240) and creates the dependency data set (250). As defined above, the dependency data set (250) is any data set that defines a number of relationships between applications and instances of network resources as deployed within a network.

Figure 3:
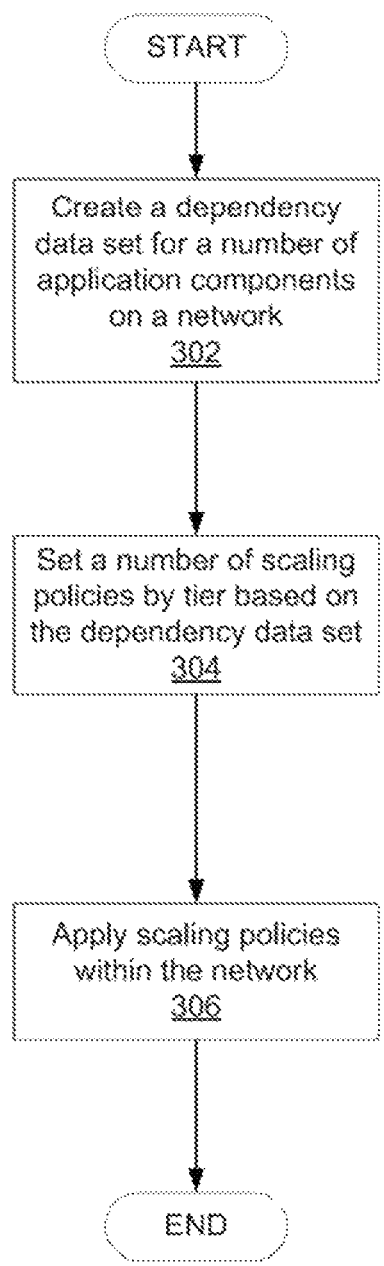
FIG. 3 is a flowchart showing a method of policy-based scaling of network resources, according to one example of the principles described herein.

FIG. 3 is a flowchart showing a method of policy-based scaling of network resources, according to one example of the principles described herein. The method of FIG. 3 may begin by creating (block 302) a dependency data set for a number of application components on a network. This network may be network A (104) of FIG. 1, for example. The cloud management device (FIG. 2, 102) creates the dependency data set. A dependency data set, as defined above, is any data set that defines a number of relationships between applications and other instances of cloud network resources within a network.

The processor (FIG. 2, 202) of the cloud management device (FIG. 2, 102) analyzes and maps the relationships and dependencies between the applications and instances of network resources within network A (104). As described above, the dependency data set may be represented as a hierarchy free with a roof node symbolizing a root resource, and a number of levels of child nodes symbolizing the relationship of a number of resources and their dependency from the root resource and their dependency with each other. In this manner, the levels within the hierarchal tree represent tiers within the network (104, 106) architecture.

Turning again to FIG. 3, the cloud management device (FIG. 2, 102) sets (block 304) a number of scaling policies by tier based on the dependency data set. As described above, a tier is defined as all nodes within a particular level of the hierarchy tree formed by the dependency data set. Thus, setting (block 304) scaling policies by tier means that a number of policies are set for a particular level within the hierarchy tree formed by the dependency data set. For example, the dependency data set may comprise a hierarchal level representing a number of web servers within a particular network (104, 106). In this example, a number of policies may be set for those web servers due to their relationship of being cousin nodes within the hierarchy tree created by the dependency data set.

In another example, the scaling policies may be set by user or group of users. For example, if a user or a group of users that desire a certain scaling policy, then the global load balancer (170) and cloud management device (102) may be employed to set these scaling policies based on that individual or groups of individual users. The setting of policies by user or group of users may be implemented separately or in addition to the above-described setting of scaling policies by tier.

The cloud management device (FIG. 2, 102) applies (block 306) the scaling policies within the network (104, 106). For example, the processes of blocks 302 and 304 may be applied to network B (106), a network that an individual or business entity currently utilizes. The scaling policies set by tier may be applied within network B (106) in order to determine when more cloud computing resources are to be acquired and utilized, or when less of the utilized cloud computing resources are to be released and terminated.

In another example, an individual or business entity may wish to scale out from their internal private network such as, for example, network A (104) info another network such as network B (106). Network B may be a public cloud service. In this example, the scaling policies may be set within network A to determine when a scaling out into network B is to take place and under what conditions and thresholds. Further, additional policies may be set to determine when a scaling in from or scaling out into network B itself is to take place and under what conditions and thresholds.

In still another example, network A (104) may not exist, and an individual or business entity desires to purchase public cloud services from the owner of a public cloud network such as, for example, network B (106). In this example, seating policies may be set within the cloud management device (102) to define when a scaling in from or scaling out into network B is to take place and under what conditions and thresholds.

In the above examples, scaling out may comprise acquisition of cloud computing resources for one tier within the hierarchal tree created by the dependency data set, or may be a number of tiers. Examples of individual tiers that may be represented by the dependency data set (250) comprise, for example, a web server tier, an application server tier, and a database tier, among others. As more detail may be provided in association with blocks 302, 304, and 306, the method will now be described in more detail in association with FIG. 4.

Figure 4:
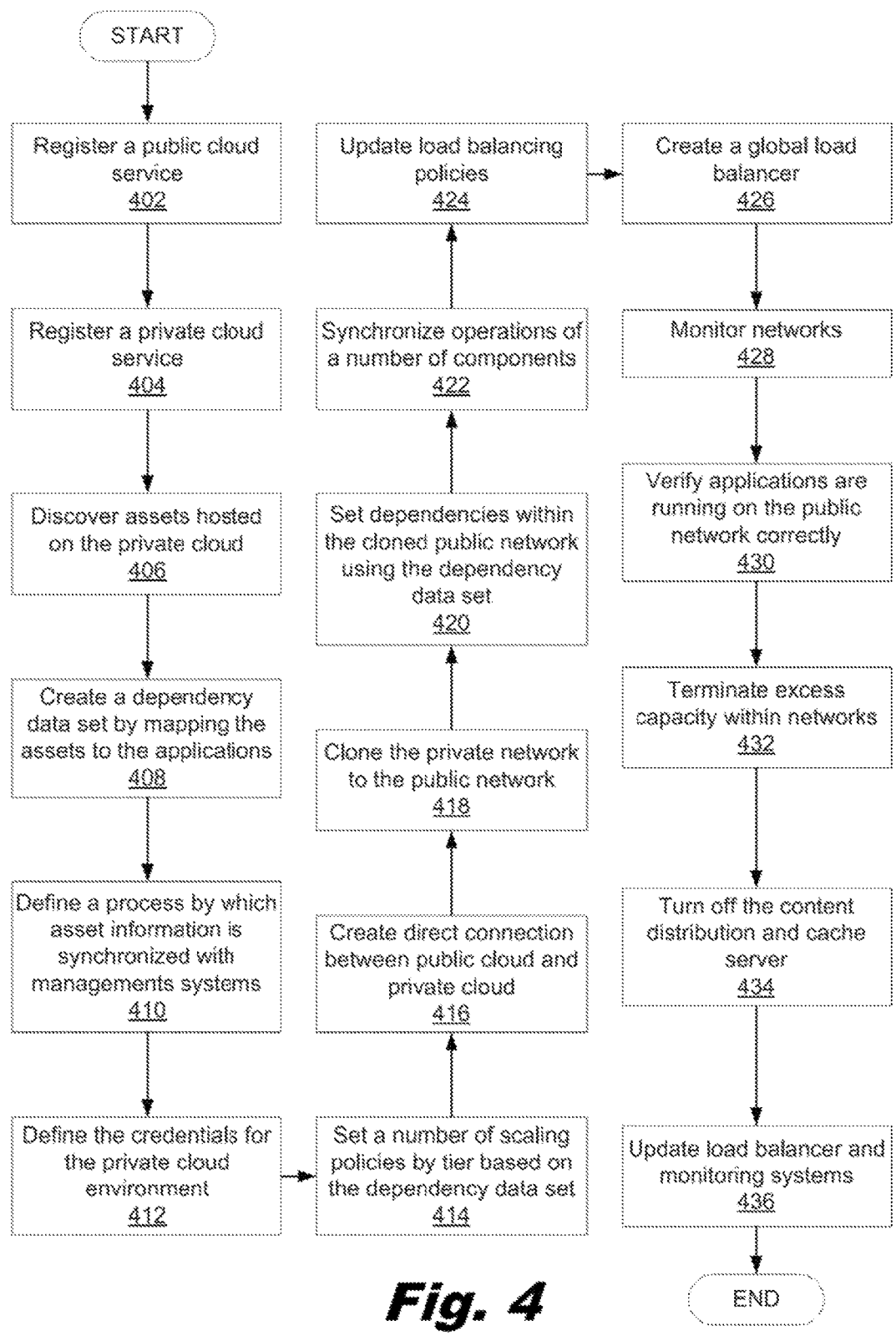
FIG. 4 is a flowchart showing a method of policy-based scaling of network resources, according to another example of the principles described herein.

FIG. 4 is a flowchart showing a method of policy-based scaling of network resources, according to another example of the principles described herein. The method of FIG. 4 may begin by registering (block 402) a public cloud service with, for example, the cloud management device (102). In one example, the purchaser of a public cloud services from a public cloud provider enters into a contract or other service agreement to purchase the public cloud services and utilizes the network B (106) for these services, For example, the public cloud services may be based on a pay-per-use model where the public cloud services are scaled in or scaled out depending on the resource needs of the purchaser.

When registering (block 402) a public cloud service, the cloud management device (102) may collect and store information such as, for example, credentials used to access network B (106), the identity of the cloud services provider, monitoring and management tools used within the network B (106), and service offerings that would be hosted on public cloud including, for example, cloud provider architectures and platforms. Some examples of the cloud provider architectures and platforms comprise AMAZON WEB SERVICES developed and sold as a service by Amazon.com, Inc., the RACKSPACE CLOUD web application hosting services developed and provided by Rackspace US, inc., and CLOUDSTACK open source cloud computing software, among others.

The cloud management device (102) registers (block 404) a private cloud service. In one example, the private network is network A (104). In this example, network A (104) may be an internal private network managed by the purchaser of a public cloud services described above in connection with block 402. In another example, network A (104) may be another public network different from network B (106) managed for and in behalf of the purchaser of a public cloud services described above in connection with block 402.

When registering (block 404) a private cloud service at network A (104), the cloud management device (102) may collect and store information such as, for example, credentials used to access network A (104), the identity of the cloud services provider, and monitoring and management tools used within the network A (104). The information collected may further include information regarding service offerings within network A (104) that are scalable such as, for example, web servers, application servers, cache servers, and databases, among others.

At block 406, the cloud management device (102) discovers assets hosted on the private cloud network; in this case network A (104). In one example, the discovery module (240) within the data storage device (204) discovers (block 404) the assets hosted on network A (104).

The cloud management device (102) creates (block 408) a dependency data set (FIG. 2, 250) by mapping the assets within network A (104) discovered at block 406. In one example, a copy of the dependency data set (FIG. 2, 250) is stored in the data storage device (204) of the cloud management device (102) for utilization at a point later in the process as will be described below. Also, in one example, an administrator (160) may perform the mapping or instruct the cloud management device (102) to perform the mapping via the display device (210) and a number of other input and output devices such as, for example, a keyboard and mouse, among others.

The process may proceed with the administrator (160) interacting with the cloud management device (102) to define (block 408) a process by which asset information is synchronized with management systems. The cloud management device (102) also defines (block 412) a number of credentials and related information for the private cloud environment to be implemented later in the process. Applications running on a cloud network such as, for example, networks A and B (104, 106) are being monitored. These applications (124, 144) and the networks (104, 106) are monitored in order to determine how the network (104, 106) is being utilized and whether the network should be scaled in or scaled out to increase or decrease services, respectively. Some examples of actions that may be monitored are the number of in-coming transactions to the network (104, 106), response times of the applications (124, 144), and availability of servers (120, 140) to address in-coming transactions, among others.

The process may proceed with the monitoring device (102) setting (block 414) a number of scaling policies by tier based on the dependency data set (FIG. 2, 250) created at block (408). As described above, a tier is defined as all nodes within a particular level of the hierarchy tree formed by the dependency data set (FIG. 2, 250). Thus, setting (block 414) a number of scaling policies by tier means that a number of policies are set for a particular level within the hierarchy tree formed by the dependency data set (FIG. 2, 250). For example, the dependency data set (FIG. 2, 250) may comprise a hierarchal level representing a number of web servers within a particular network (104, 106). In this example, a number of policies may be set for those web servers due to their relationship of being cousin nodes within the hierarchal tree created by the dependency data set (FIG. 2, 250).

One example of a scaling policy may include a threshold of, for example, database usage. In this example, the scaling policy may state that if a threshold percentage, such as 60%, of all databases is utilized, then the database tier maybe scaled out to acquire more databases. This example database tier policy may be implemented within network A (104). In this example, when network A (104) experiences a threshold utilization percentage, such as, for example, 60%, of its databases within the database tier of network A (104), the system (100) may be scaled out into the public network B (106) to acquire more database space. Further, this example database tier policy may also be implemented within network B (106), in this example, when network B (106) experiences a 60% utilization of its databases within the database tier of network B (106), the system (100) may be scaled out to acquire more database space either within network B (106) or another network where such resources may be acquired. Tiers to which the scaling policies may be implemented may include, for example, a load balancer tier, a server tier, a web server tier, an application server tier, a database tier, among others. In one example, a particular scaling policy may be implemented at any number of tiers within the system. In another example, a scaling policy may be implemented at only one tier.

Other scaling policies may be set that define any parameter associated with scaling in or scaling out of cloud services. The scaling policies may define under what circumstances additional resources should be purchased or utilized from an external cloud services provider or within the external cloud services provider. The scaling policies may also define under what circumstances resources should be terminated or removed as externally provided cloud services provider or within the external cloud services provider, Various factors may influence the creation and implementation of scaling policies. These factors include the environment in which the activity is implemented, the cost of scaling in or scaling cut, and forecasted market stability, among others.

In one example, the scaling policies are stored in the data storage device (204) of the cloud management device (102) and implemented by the processor (202). In another example, the scaling policies (260) are stored on the network (104, 106) at which those policies are to be implemented. In this example, the scaling policies (260) are stored on a data storage device within the hardware architecture of the network (104, 106).

In still another example, the scaling policies (260 are stored as metadata. In this example, the metadata defines scaling policies by tier. Further, an administrator (160) or other individual may alter the metadata in order to alter the policies that define under what conditions scaling out to another network (106) or scaling within a network (104, 106) is to occur. The utilization of metadata in this manner assists in the automation of the policy-based scaling throughout and within the networks (104, 106).

In still another example, the metadata may also provide default de-allocation policies. In this example, the de-allocation policies define when a number of applications, application components, or network resources are to be de-allocated due to, for example, lack of a need for those resources. Like the scaling policies described above, these de-allocation policies may also be altered to fit a particular need or circumstance.

After a number of scaling policies are set (block 414), the monitoring device (102) creates (block 416) a direct connection between the private network A (104) and the public network B (106), with the cloud management device (102) being an intermediary. A cloning (block 418) of the private network A (104) and its application components to the public network B (106) may then be initiated. For example, if network A (104) comprises a particular web server or application server such as, for example, an APACHE HTTP server owned and developed by the Apache Software Foundation, then this server is cloned (block 418) within network B (106) to function the same and comprise the same parameters as the version of the server within network A (104). Application components that may be cloned from network A (104) to network B (106) comprise, for example, web servers, and application servers, among many others.

The cloud management device (102) in association with block 418, sets (block 420) dependencies within the cloned public network B (106). In setting (block 420) these dependencies, the cloud management device (102) utilizes the dependency data set (260) created at block 408 and stored within the data storage device (204) of the cloud management device (102). Thus, the dependencies among the various application components are defined after a clone of the application components are created in the public network B (106).

The cloud management device (102) synchronizes (block 422) operations of a number of components within network A (104) that were cloned within network B (106). Some components within a cloud network such as, for example, a web server are stateless in that they simply reply to requests. However, some components, such as a database, are dynamically changing as the network is utilized. For example, network A (104) may compose a number of dynamic components such as a database that are continually changing, if the database was copied directly from network A (104) to network B (106), intermediate transactions may occur on network A (104) that would not be reflected within the copy of the database in network B (106).

Therefore, at block 422, the cloud management device (102) begins to synchronize these dynamic components between network A (104) and network B (106) to ensure that the components are mirrored between network A (104) and network B (106). In one example, the cloud management device (102) ensures that the bad balancer (127) within network A (104) is utilized at least until the cloned dynamic components are completely synchronized. After the cloned dynamic components are completely synchronized, the cloud management device (102) may then adjust load balancing policies within the system (100).

The cloud management device (102) then updates (block 424) a number of load balancing policies. The load balancers (127, 147) within the system (100) generally receive incoming transaction (HTTP) requests and assign those transaction requests to a server (120, 140) within the network (104, 106). Thus, at block 424, the cloud management device (102) may update the bad balancing policies used by the load balancers (127, 147) to include the ability to use the newly cloned load balancer (14) within network B (106) and its associated application components and resources.

In connection with block 424 described above, the cloud management device (102) may, at one point, create (block 426) a global load balancer (FIG. 1, 170). The global load balancer (170) assists in updating the load balancing policies with the load balancers (127, 147) and directing new transaction requests to network B (106) instead of network A (104).

In one example, the global load balancer (170) may comprise a set of policies that define where transaction requests are directed, in this manner, the global load balancer (170) distributes workloads across the system (100) or other resources to achieve optimal resource utilization, maximize throughput, minimize response time, and avoid overload. The global load balancer (170) further acts as the load balancer for the public network B (106) during certain points of the process. In one example, the policies within the global load balancer (170) may be updated in order to redirect traffic from network A (104) to network B (106), or visa versa.

Once application components are placed within the public network B (106), the private network A (104) and public network B (106) are then monitored (block 428). As described above, monitoring of a cloud network assists an administrator (160) in knowing when to scale in or scale out. Also, monitoring the program components helps the administrator (160) know when a number of program components are over-utilized, malfunctioning, or experiencing any undesirable condition within the networks (104, 106).

The cloud management device (102) may be used to verify (block 430) that the applications within network B (106) as cloned are running correctly. Thus, at block 430, an administrator (160) may instruct the cloud management device (102) to launch network B (106) by accepting, for example, transaction requests to ensure that all program components are correctly executing and are cooperating among each other.

After network B (106) has been verified and the application components are present within network B (106), the cloud management device (102) may terminate (block 432) excess capacity within a number of the networks (104, 106). In one example, the termination (block 432) of excess capacity may be implemented upon administrator (160) request, in another example, the termination (block 432) of excess capacity may be triggered based on its level of usage. This termination (block 432) may be viewed as a scaling in. For example, if the private network A (104) is scaled out to the public network B (106) due to the over-utilization of resources within the private network A (104), then a portion of the over-utilized resources within the private network A (104) may be scaled in because of the scaling out into network B (106). This over-utilization may be made to the administrator (160) via a number of components such as, for example, the global load balancer (170), the cloud management device (102), and the display device (210), among others.

The process continues with the cloud management device (102) turning off a content distribution and cache sever. Further, the cloud management device (102) may also update (435) the load balancer (147) and other monitoring systems within network B (106) and the global load balancer (170) to direct transaction requests to network B (106).

The methods described in FIGS. 3 and 4 may be performed by any individual. In one example, these methods are performed by a third party. In this example, the third party may fee someone other than the owner or owners of private network A (104) or public network B (106). Thus, the third party may offer the above methods as a service. In another example, the methods of FIGS. 3 and 4 may be performed by an administrator associated with the private network A (104). In this example, the administrator (160) may be an employee or the owner of private network A (104) or a person who is contracted to perform such services.

The methods described above can be accomplished by a computer program product comprising a computer readable storage medium having computer usable program: code embodied therewith that when executed performs the above methods. Specific-ally, the computer usable program code may create (block 302) a dependency data set for a number of application components on a network. The computer usable program code may further set (block 304) a number of scaling policies by tier based on the dependency data set. Still further, the computer usable program code may apply (block 306) the scaling policies within the network. Further, the computer usable program code may, when executed by a processor, perform the processes described above in connection with FIG. 4.

The specification and figures describe a method and system of policy-based scaling of network resources. The method comprises, with a processor, creating a dependency data set for a number of application components on a network, setting a number of scaling policies by tier based on the dependency data set, and applying the scaling policies within the network. These systems and methods may have a number of advantages, including: (1) providing an efficient system to address scaling in and scaling out from end-to-end; (2) provides a level of abstraction between cloud service providers; (3) provides a comprehensive end-to-end system that updates monitoring and management systems where the assets are hosted; (4) all of the above advantages are triggered at the network level so there is no need any extra software.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of policy-based scaling of network resources comprising:
    creating, by a physical processor of a server, a dependency data set for a set of application components on a cloud network, wherein the dependency data set comprises a tiered hierarchy of information about the set of application components on the cloud network, wherein the tiered hierarchy of information comprises a plurality of levels of different components of the set of application components;
    setting, by the physical processor, a set of scaling policies by tier based on the dependency data set; and
    applying, by the physical processor, a respective scaling policy of the set of scaling policies to each one of the plurality of levels of the tiered hierarchy of information, wherein the respective scaling policy is applied to each application component associated with the each one of the plurality of levels of the tiered hierarchy of the dependency data set.

2. The method of claim 1, wherein setting the set of scaling policies by tier comprises:
    setting the respective scaling policy of the set of scaling policies by tier based on the dependency data set and based on the application of the respective scaling policy of the set of scaling policies for a respective set of users.

3. The method of claim 1, wherein the cloud network comprises a public cloud network, and wherein the method further comprises:
    responsive to scaling out a private cloud network to the public cloud network, terminating excess capacity within the private cloud network.

4. The method of claim 1, further comprising:
    discovering a set of programs within the cloud network; and
    creating the dependency data set based on the relationships between the discovered set of programs.

5. The method of claim 3, further comprising:
    scaling out the private cloud network to the public cloud network by cloning the private cloud network, wherein cloning the private cloud network to the public cloud network comprises:
        cloning a set of application components of the private cloud network to the public cloud network; and
        synchronizing operations of the set of application components that were cloned from the private cloud network into the public cloud network.

6. The method of claim 5, wherein scaling out the private cloud network to the public cloud network further comprises:
    load balancing across the private cloud network and the public cloud network; and
    updating load balancing policies of a set of load balancers of the private cloud network and the public cloud network.

7. A cloud management device for policy-based scaling of network resources, the cloud management device comprising:
 a physical processor; and
 a data storage device communicatively coupled to the processor,
 wherein the processor implements machine readable instructions that cause the cloud management device to:
  create a dependency data set for a set of application components on a cloud network, wherein the dependency data set comprises a tiered hierarchy of information about the set of application components on the cloud network, wherein the tiered hierarchy of information comprises a plurality of levels of different components of the set of application components;
  set a set of scaling policies by tier based on the dependency data set; and
  cause application of a respective scaling policy of the set of scaling policies to each one of the plurality of levels of the tiered hierarchy of information, wherein the respective scaling policy is applied to each application component associated with the each one of the plurality of levels of the tiered hierarchy of the dependency data set.

8. The cloud management device of claim 7, wherein the physical processor implements machine readable instructions that cause the cloud management device to:
 discover a set of program components within a set of networks; and
 create the dependency data set based on the relationships between the discovered programs.

9. The cloud management device of claim 8, wherein the physical processor implements machine readable instructions that cause the cloud management device to:
 scale out a private cloud network of the set of networks to a public cloud network of the set of networks by cloning the private cloud network, wherein cloning the private cloud network to the public cloud network comprises:
  cloning a set of application components of the private cloud network to the public cloud network; and
  synchronizing operations of the set of application components that were cloned from the private cloud network into the public cloud network.

10. The cloud management device of claim 9 wherein the physical processor implements machine readable instructions to scale out the private cloud network to the public cloud network by:
 load balancing across the set of networks; and
 updating load balancing policies of a set of load balancers of the set of networks.

11. A non-transitory machine-readable storage medium comprising instructions executable by a physical processor of a computing system for scaling network resources, the non-transitory machine-readable storage medium comprising:
 instructions to, when executed by the processor, create a dependency data set for a set of application components on a set of networks, wherein the dependency data set comprises a tiered hierarchy of information about the set of application components on a cloud network, wherein the tiered hierarchy of information comprises a plurality of levels of different components of the set of application components;
 instructions to, when executed by the processor, set a set of scaling policies by tier based on the dependency data set, wherein the tiers comprise a web server tier, an application server tier, and a database tier; and
 instructions to, when executed by the processor, apply a respective scaling policy of the set of scaling policies to each one of the plurality of levels of the tiered hierarchy of information, wherein the respective scaling policy is applied to each application component associated with the each one of the plurality of levels of the tiered hierarchy of the dependency data set.

12. The non-transitory machine-readable storage medium of claim 11, further comprising
 instructions to, when executed by the processor, scale out a private cloud network of the set of networks to a public cloud network of the set of networks by cloning the private cloud network, wherein cloning the private cloud network to the public cloud network comprises:
  cloning a set of application components of the private cloud network to the public cloud network; and
  synchronizing operations of the set of application components that were cloned from the private cloud network into the public cloud network.

13. The non-transitory machine-readable storage medium of claim 12, wherein scaling out the private cloud network to the public cloud network further comprises:
 instructions to, when executed by the processor, load balance across the private cloud network and the public cloud network; and
 instructions to, when executed by the processor, update load balancing policies of a set of load balancers of the set of networks.

14. The method of claim 1, further comprising:
 determining whether to scale out the cloud network based on a subset of scaling policies of the set of scaling policies.

15. The method of claim 1, wherein the tiers of the dependency data set comprise:
 a web server tier, an application server tier, and a database tier.

16. The cloud management device of claim 7, wherein the physical processor implements machine readable instructions that cause the cloud management device to:
 determine whether to scale out the cloud network based on a subset of scaling policies of the set of scaling policies.

17. The non-transitory machine-readable storage medium of claim 13, further comprising:
 instructions to, when executed by the processor, determine whether to scale out the cloud network based on a subset of scaling policies of the set of scaling policies.

* * * * *